Figure 1:
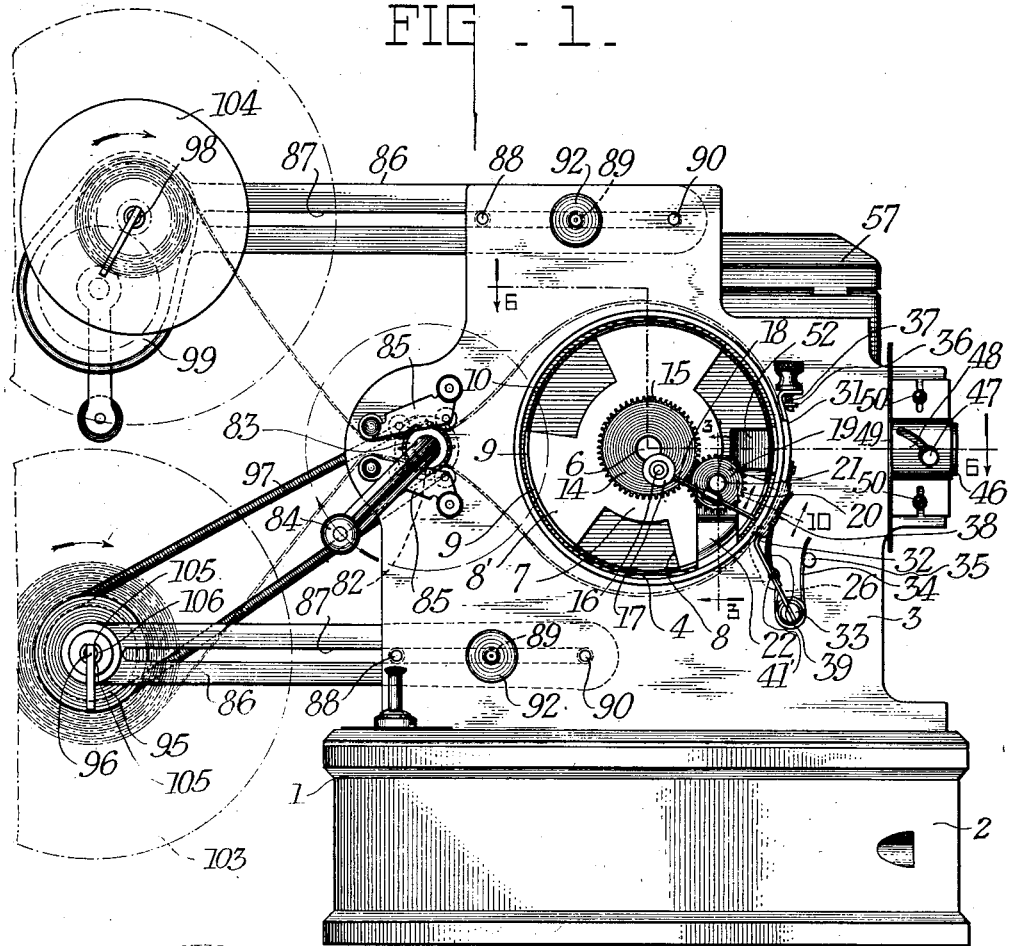

June 5, 1928.

J. G. CAPSTAFF 1,672,845

MOTION PICTURE PROJECTOR

Filed Feb. 20, 1925 2 Sheets-Sheet 1

INVENTOR.
John G. Capstaff,
BY R. L. Stinchfield
N. M. Perrus
ATTORNEYS.

June 5, 1928.
J. G. CAPSTAFF
1,672,845
MOTION PICTURE PROJECTOR
Filed Feb. 20, 1925 2 Sheets-Sheet 2
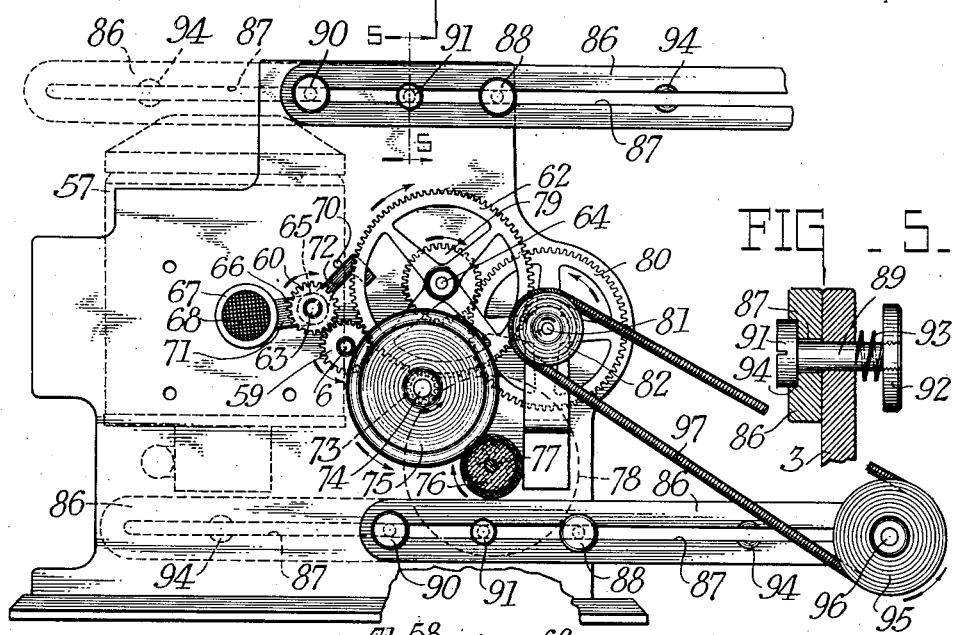
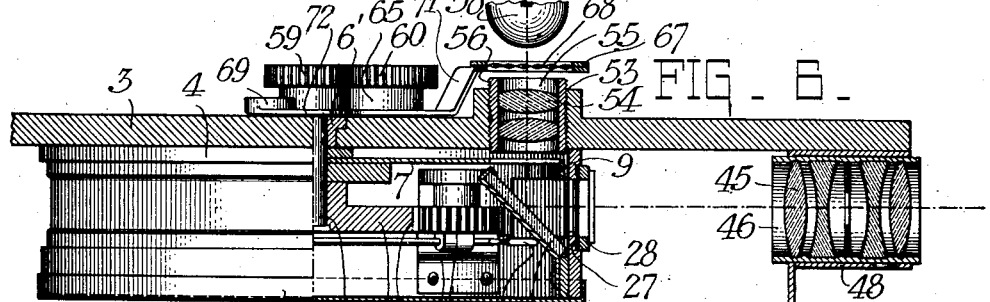
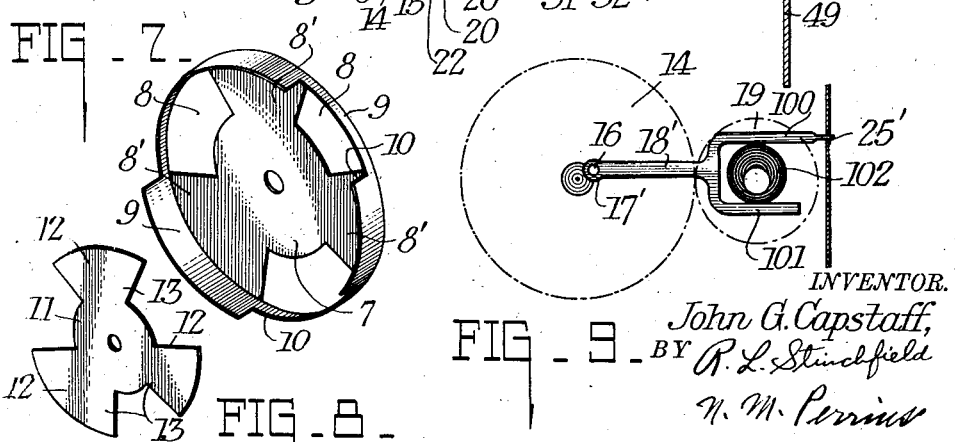
INVENTOR.
John G. Capstaff,
BY R. L. Stinchfield
N. M. Perrine
ATTORNEYS.

Patented June 5, 1928.

1,672,845

UNITED STATES PATENT OFFICE.

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK.

MOTION-PICTURE PROJECTOR.

Application filed February 20, 1925. Serial No. 10,601.

This invention relates to motion picture projectors and more particularly to projectors of a portable type, designed primarily for use by unskilled persons. The objects of the invention in such a projector are ease of loading and operation, lightness, simplicity, compactness, low cost of manufacture, a high pulldown speed, and ease of framing. These objects are attained by the particular arrangement of the several parts, the enclosure of the pulldown mechanism in a housing, the exterior curved surface of which forms a guide for a loop of film, the mounting of the pulldown claw on two discs rotating at different speeds. The above and other objects are further obtained from other details of structures and arrangement more fully described in the following specification and shown in the accompanying drawings, in the several figures of which the same reference characters denote the same parts and in which—

Fig. 1. is a front elevation of my improved projector.

Figures 2, 3:
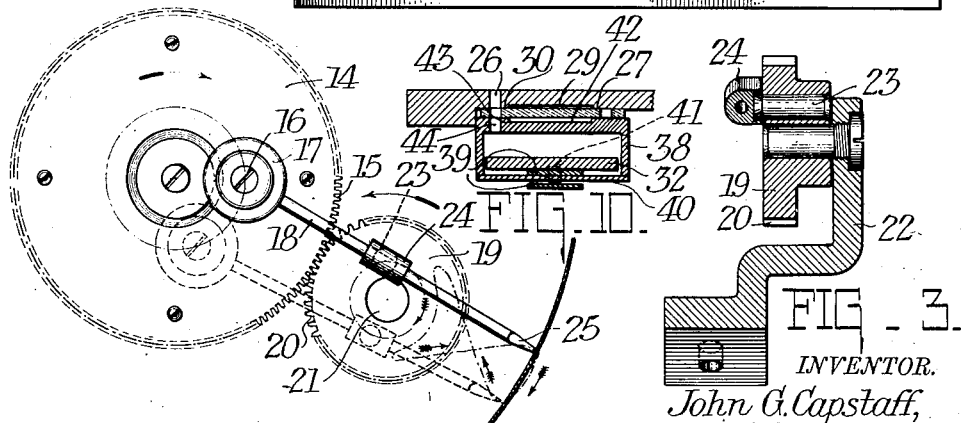

Fig. 2. is an elevation of the pulldown mechanism, showing the path of the claw.

Fig. 3. is a section on line 3—3, Fig. 1.

Fig. 4. is a rear elevation of the projector, the lamp house being shown in dotted lines.

Fig. 5. is a section on line 5—5, Fig. 4.

Fig. 6. is a section on line 6—6, Fig. 1.

Fig. 7. is a perspective view of one form of shutter.

Fig. 8. is a perspective view of a different form of shutter.

Fig. 9. is a plan of a modified pulldown mechanism.

Fig. 10 is a section on line 10—10, Fig. 1.

In the preferred embodiment of my invention herein disclosed, the mechanism is mounted on a suitable hollow base 1, having a slidable door 2, permitting the use of the compartment in the base for the storage of accessories. Upon top of this is a main vertical wall or frame 3, upon one surface of which is rigidly secured a cylindrical housing or container 4, having a suitable cover 5, the cover being shown only in Fig. 6.

A shaft 6 extends through the bushing 6' in frame 3, centrally of the housing 4, and upon this is rigidly mounted a shutter disc 7 having alternate sector openings 8 and leaves 8' and a marginal flange 9 with cut out portions 10 therein registering angularly with the openings 8. In a modified form of my shutter shown in Fig. 8, the flange is omitted and the shutter consists merely of a disc 11, with alternating sector openings 12 and leaves 13.

Upon shaft 6 is also rigidly mounted a disc 14 with peripheral gear teeth 15. Eccentrically mounted on this gear is a trunnion 16 about which is the eye 17 on one end of lever 18. Intermeshing with this gear wheel is a second disc 19 having peripheral teeth 20, and mounted to rotate on trunnion 21 carried by a bracket 22 fixed upon the housing 4. The size of gear 14 is an even multiple of that of gear 19; in this case it has twice the diameter and circumference so that the smaller gear rotates twice for every revolution of the larger gear. Eccentrically mounted on gear disc 19 is a trunnion 23 free to turn therein and carrying a tubular eye or guide 24 within which the lever 18 is slidable. The free end of lever 18 is more or less pointed at 25 and constitutes a film engaging claw.

When the gears are assembled the relative positions of the trunnions 16 and 21 are definitely fixed and the path of the claw determined. It can be altered by removing one of the gears, giving it a partial rotation and re-engaging the gear teeth. The path of the claw for the relative positions shown is indicated in dotted lines in Fig. 2. This path crosses the circumference of the housing 4 in a curve and at this place a slot 26 is formed in the housing.

At this portion of the housing there is formed in its outer convex surface a seat 27 extending from below slot 26 to above the projection window 28. This seat is formed with the usual central concavity 29 and marginal ledges 30, in one of which slot 26 is formed as shown in Fig. 10. Opposite this seat is a film gate member 31 comprising a bowed sheet metal strip 32 extended at its lower end to engage pintle 33 on frame 3 about which it may be swung. It is impelled toward its seating position by spring 34, one arm of which engages a fixed lug 35 on frame 3. Slidable on the strip 32 is a framing member 36, adjustable vertically by means of screw 37, and located opposite the window 28. Also carried by the strip 32 is a presser member 38 which is a hollow box-like structure surrounding strip 32 and impelled toward the seat 27 by a double spring 39 engaging both sides of its rear wall 40, the spring being attached at 40 at 41, and to 32 at 41'. The front surface of the presser member 38 is normally spring pressed into a position where it forms a smooth curve with the upper part of the strip 32, the two parts together fitting nicely around the seat 27 of the housing. It is formed with a central cavity 42 and marginal ledges 43 and has a slot 44 registering with slot 26 for the passage of claw 25.

In line with the window 28 is an objective 45 in mount 46 which is adjustable for focussing by means of a pin 47 engaging a helical slot in the tube 48, which is carried on a support 49 adjustable on the frame 3 by the screw and slot connection 50.

Within the housing 4 the mirror 51 is supported behind the window 28 at an angle of 45° by bracket 52. Opposite this mirror is an opening 53 in frame 3 within which is supported the condenser 54 in mount 55, the mount and opening have a screw thread engagement 56. Behind this is mounted lamp house 57 containing the lamp 58 in line with the condenser.

Shaft 6 extends through the frame 3 and carries in the rear thereof a gear wheel 59 meshing with gears 60 and 62 on stub shafts 63, and 64 respectively. Mounted to swing on shaft 63 and frictionally engaging a hub 65 on gear 60 is a member 66 carrying on one arm 71 a frame 67 with a metal wire screen 68 and on the other arm 72 a counterweight 69 insufficiently to completely counterbalance the screen and its frame. When the parts are stationary the screen will fall to the position shown in Fig. 4 where it is in line with the condenser and lamp, its movement being limited by the engagement of the arm 72 with lug 70. When the gear 60 turns in its normal direction indicated by an arrow in Fig. 4, the member is moved by friction, assisted by the counterweight, so that the screen is lifted from its position in line with the condenser, the movement being limited by arm 72 engaging shaft 6.

Gear 62 meshes with pinion 72 carried on a stub shaft 74 upon which is also mounted a flywheel 75 engaged at its periphery frictionally by driving wheel 76 on shaft 77 of a motor. The motor is not shown but its position is indicated by the dash line 78.

Shaft 64 also carries gear 79 which meshes with gear 80 on shaft 81, which also carries pulley 82 on the rear and a sprocket 83 and a manual driving crank 84 in front of frame 3. Hinged presser members 85 of familiar design hold the film on the sprocket 83 as it is fed to and from the loop of film surrounding housing 4.

Similar reel supports 86 are provided at the top and bottom of frame 3. Each consists of a horizontal bar with a longitudinal slot 87 by which it is slidable over three headed pins. The end pins 88 and 90 act merely as guides and supports. The central pin 89, shown in Fig. 5, has heads 91 and 92 at its ends, head 92 being pressed forwardly by spring 93. Head 91 engages in sockets 94 in the rear surface of the support 86 to position the latter in extended or retracted position.

On the outer end of lower support 86 is supported a shaft carrying a pulley 95 and a hinged latch 96 adapted to engage, when folded down, the notches 105 in the extended cylindrical core 106 of the film reel 103. It is not intended that this reel will usually be removed from the shaft, and the latch serves primarily to disconnect it from driving relation with the shaft during rewinding. A wire coil belt 97 extending around pulleys 95 and 82 constitutes a friction drive for the reel. The upper support carries a support 98 for a reel of film 104 and a rewinding mechanism 99, the details of which are unimportant.

In Fig. 9 is indicated a modified film advancing mechanism mounted on the discs 14 and 19. Trunnion 16 eccentrically mounted on the larger disc 14 carries the eye 17' of lever 18' which is bifurcated, one arm 100 having a film engaging claw 25' and the other arm 101 being shorter and parallel thereto. Between arms 100 and 101 is a cam 102 fixed to and eccentric of the disc 19.

With this movement as with the one first described the pulldown claw is moved up and down twice for every in and out movement so that it engages the film only on every alternate up and down stroke. The mechanism is advanced either by handle 84 or motor 78 and the film is fed regularly to and from the gate. The speed is preferably such that the pulldown claw advances the film at the standard rate, usually sixteen times per second. The proportion of the time spent in advancing the film is obviously small.

The relation of the lamp house, shutter and mirror is compact, and permits the use in a projector of a single feed sprocket. The curved gate and cylindrical housing afford a structure permitting the threading of the film with the greatest convenience. The curvature of the gate is not so great as to be objectionable in the optical system, while it is sufficient to prevent lateral buckling and it insures the film being drawn and maintained very exactly in the intended position; and this certainty in the position of the film more than counterbalances any faults introduced by the curvature.

The foraminous metal screen 68 cuts off enough light and heat rays to prevent overheating of the film when the machine is stopped and the light burning, while it conducts away the intercepted heat rays, and permits enough light to pass to project a still picture. It is so removed from the film that it cannot, if it should become itself heated, affect the film by radiation.

It is to be understood that the structures herein disclosed are by way of example and that I contemplate as within the scope of my invention all such modifications and equivalents as fall within the appended claims.

Having thus described my invention, what I claim as new and desire to secure by Letters Patent is:

1. A mechanism for advancing a band comprising two directly intergeared discs, the circumference of one of which is an even multiple of the circumference of the other, a lever having band engaging means and eccentrically pivoted to said larger disc, and means mounted eccentrically of the smaller disc and engaging the lever to oscillate a portion thereof transversely at a more rapid rate than the larger disc oscillates the pivoted point thereof.

2. A mechanism for advancing a band comprising two discs, means for rotating one of said discs at an even multiple of the speed of the other, a lever pivotally connected at one end to the slower rotating disc and having band engaging means at the other end, the faster rotating disc having a member eccentrically mounted thereon and engaging an intermediate portion of the lever to oscillate it transversely, said lever and member having a sliding relation whereby the lever may be oscillated longitudinally by the slower rotating disc through the pivotal connection.

3. A mechanism for intermittently advancing a perforated band comprising two discs lying in the same plane and having interengaging peripheral gears, the circumference of one gear being an even multiple of the circumference of the other, a lever having at one end a longitudinally extending film engaging claw and at its other end being pivotally connected to said larger disc eccentrically thereof, and means mounted eccentrically of the smaller disc and engaging the lever intermediate of its ends to oscillate such intermediate portion transversely more rapidly than the larger disc oscillates the end and permitting it to be moved longitudinally by the pivotal connection.

4. A mechanism for advancing a motion picture film band comprising two intergeared discs, the circumference of one of which is an even multiple of the circumference of the other, a lever having a band engaging claw at one end, and at its other end having an eccentric engagement with the larger disc, whereby the larger disc transmits to it an oscillatory motion the principal component of which is longitudinal of itself, and means mounted eccentrically of the smaller disc and engaging the lever at an intermediate point of its length whereby it is caused to oscillate transversely at a more rapid rate than it oscillates longitudinally.

5. In a motion picture projector, a guideway for film and mechanism for advancing a film band through said guideway, said mechanism comprising two directly intergeared discs, one of the discs being farther from the guideway than the other and having a circumference that is a multiple of the circumference of the other, a lever having a band engaging claw at one end, and its other end having an eccentric engagement with the larger disc whereby it is given an oscillatory movement toward and from the guideway, and means mounted eccentrically of the smaller disc and engaging the lever at an intermediate point in its length, to oscillate it longitudinally of the guideway at a more rapid rate than it is oscillated toward and from the guideway.

Signed at Rochester, New York, this 16 day of February, 1925.

JOHN G. CAPSTAFF.